United States Patent Office 3,183,226
Patented May 11, 1965

3,183,226
PROCESS FOR TRANSFORMING 1-β-D-XYLOFUR-
ANOSYLURACIL NUCLEOSIDES INTO 1-β-D-
ARABINOFURANOSYLURACIL NUCLEOSIDES
James H. Hunter, Kalamazoo, Mich., assignor to The
Upjohn Company, Kalamazoo, Mich., a corporation of
Delaware
No Drawing. Filed Jan. 10, 1961, Ser. No. 81,691
15 Claims. (Cl. 260—211.5)

This invention pertains to a novel chemical process, and to intermediates produced thereby. More particularly, the invention is directed to a novel process for transforming 1-β-D-xylofuranosyluracil nucleosides into the corresponding 1-β-D-arabinofuranosyluracil nucleosides. In carrying out the process of the invention the novel intermediates, 1-[2'-O-(R'-sulfonyl)-β-D-xylofuranosyl]-uracils (compounds of Formula II below), and 1-(2',3'-epoxy-β-D-lyxofuranosyl)uracils (compounds of Formula III below), are prepared.

The invention provides a synthesis of a variety of important 1-β-D-arabinofuranosyluracil nucleosides. For example, it provides a new synthesis of 1-β-D-arabinofuranosyluracil (spongouridine), 1-β-D-arabinofuranosyl-5-methyluracil (spongothymidine), the naturally occurring nucleosides first discovered in sponges, as well as other 1-β-D-arabinofuranosyl-5-alkyluracils. It also provides an effective synthesis of 1-β-D-arabinofuranosyl-5-halouracils which are antimetabolites active aganist viruses.

Previously, Fox et al. [Jour. Am. Chem. Soc. 79, 2775-2778 (1957)] prepared spongothymidine from 1-β-D-ribofuranosylthymine, and Brown et al. [Jour. Chem. Soc. (1956), 2388-2393] prepared spongouridine from 1-β-D-ribofuranosyluracil.

Fox et al. utilized the 5'-trityl-2'-methylsulfonyl derivative which was converted to the 5'-trityl-O²,2'-cyclo-β-D-ribofuranoside which in turn was hydrolyzed (opening of cyclo-ring and detritylation) to give the 1-β-D-arabinofuranosylthymine. Similarly, Brown et al. prepared 1-[3',5'-di-O-acetyl-2'-O-(p-tolylsulfonyl) - β - D - ribofu-syl]uracil and treated it with methanolic ammonia to ranosyl]uracil and treated it with methanolic ammonia to obtain a 1-(O²,2' - cyclo - β - D - arabinofuranosyl)uracil which, on mild hydrolysis with dilute sulfuric acid gave 1-β-D-arabinofuranosyluracil.

The preparation of 1-β-D-lyxofuranosylthymine from 1-β-D-xylofuranosylthymine has been described by Fox et al., Jour. Am. Chem. Soc. 80, 5155-5160 (1958). They prepared the 3',5'-O-isopropylidene derivative and treated it with methylsulfonyl chloride in pyridine to obtain the corresponding 2'-O-methylsulfonyl derivative. The 3',5'-O-isopropylidene - O²,2' - cyclonucleoside was then prepared by refluxing in dilute aqueous alcoholic sodium hydroxide for several hours. The 1-β-D-lyxofuranosylthymine product was obtained by refluxing in aqueous ethanol:hydrochloric acid.

In accordance with the process of the present invention it has now been found that after blocking the 3',5'-position of a 1-β-D-xylofuranosyluracil and introducing an R'-sulfonyl group in the 2'-position, the 3',5'-O-blocking group can be removed while the 2'-O-(R'-sulfonyl) group is left intact, and a 2',3'-epoxy-β-D-lyxofuranoside is then obtained by internal displacement of the R'-sulfonyl group. The corresponding 1-β-D-arabinofuranosyluracil is then obtained by acid hydrolysis of the 2',3'-epoxy-β-D-lyxo-furanoside. The process of the invention is an improvement over prior art methods, because opening of the epoxy ring is a facile and uncomplicated hydrolysis, and the 1-β-D-arabinofuranosyluracil is obtained in high yield uncontaminated with by-product xylosides or the α-anomers.

The process of the invention is depicted by the following flow diagram:

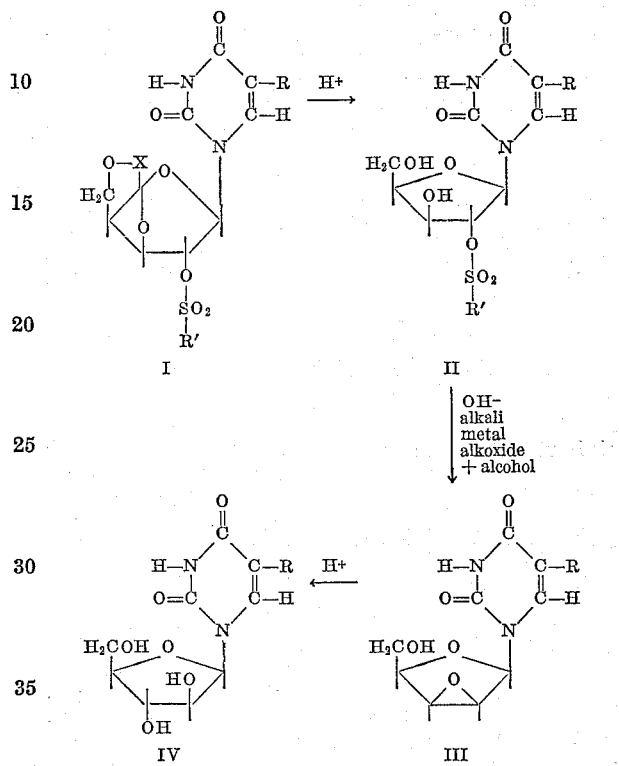

wherein R is selected from the group consisting of hydrogen, alkyl, for example, methyl, ethyl, propyl, butyl, pentyl, hexyl, heptyl, octyl and isomeric forms thereof and halogen e.g., chlorine, bromine, iodine, and fluorine; and R' is selected from the group consisting of alkyl, e.g., methyl, ethyl, propyl, butyl, hexyl, heptyl, octyl, and isomeric forms thereof; aryl, e.g., p-methylphenyl, p-bromophenyl, and phenyl; and aralkyl, e.g., benzyl and 2-phenethyl; and X is an alkylidene or aralkylidene blocking group.

The 1-[3',5'-O-"blocked"-2'-O-(R' - sulfonyl)-β-D-xylofuranosyl]uracils (compounds of Formula I) are obtained by blocking the 3',5'-positions of the xylofuranose moiety and then introducing an R'-sulfonyl group at the 2'-position. Suitable methods are known in the art [see Baker et al., Jour. Am. Chem. Soc. 77, 7–12 (1955) and "Carbohydrate Chemistry," Pigman and Goepp, p. 177 (1948), Academic Press, N.Y.].

In general, a 1-(3'-5'-O-"blocked"-β-D-xylofuranosyl) uracil is obtained by treating a 1-β-D-xylofuranosyluracil with a suitable blocking agent, illustratively an alkanone, for example, acetone, methyl ethyl ketone, methyl isobutyl ketone, methyl isopropyl ketone, and methyl hexyl ketone; or an aldehyde, for example, formaldehyde, benzaldehyde, acetaldehyde, propionaldehyde, and the like.

The 1-(3',5'-O-"blocked"-β-D-xylofuranosyl)uracil is converted to the corresponding 1-[3',5'-O-"blocked"-2'-O - (R ' -sulfonyl)-β-D-xylofuranosyl]uracil by reaction with an R'-sulfonyl halide, for example, methylsulfonyl chloride or bromide, ethylsulfonyl chloride or bromide, or like lower-alkylsulfonyl chlorides or bromides, p-tolylsulfonyl chloride or bromide, p-bromophenylsulfonyl chloride or bromide, phenylsulfonyl chloride or bromide, benzylsulfonyl chloride or bromide, phenethylsulfonyl chloride or bromide, and the like aryl- and aralkylsulfonyl chlorides or bromides.

The novel 1-[2'-O-(R'-sulfonyl)-β-D-xylofuranosyl]uracil intermediates of this invention (compounds of Formula II) are prepared by treating a 1-[3',5'-O-"blocked"-2'-O-(R'-sulfonyl)-β-D-xylofuranosyl]uracil with acid in a solvent, for example, 1% to 5% of a mineral acid, e.g., HCl, $H_2SO_4$, and $H_3PO_4$ in ethanol, or preferably, 40% to 80% (v./v.) of an aqueous organic acid, e.g., acetic, propionic, and butyric acids. The hydrolysis proceeds at temperatures between about 10° and 75° C., preferably at about 40° to 60° C. The 1-[2'-O-(R'-sulfonyl)-β-D-xylofuranosyl]uracil is separated from the excess acid and the hydrolyzed blocking group by conventional procedures such as filtration, solvent extraction, evaporation, and crystallization.

Formation of the novel 1-(2',3'-epoxy-β-D-lyxofuranosyl)uracil intermediates (compounds of Formula III) of the invention is accomplished by treating an anhydrous solution of a 1-[2'-O-(R'-sulfonyl)-β-D-xylofuranosyl]uracil in a solvent, for example, methanol, ethanol, and isopropanol, with a base (preferably an equivalent amount), for example, sodium hydroxide and potassium hydroxide, preferably an alcoholic alkali metal alkoxide such as a methanol solution of sodium or potassium methoxide, an ethanol solution of sodium ethoxide, or an isopropanol solution of sodium isopropoxide. This reaction can be carried out at temperatures between about −10° C. to about 100° C., and conveniently, at ice-bath temperatures up to the reflux temperature of the mixture. The product is recovered by removing the solvent and the alkali-metal sulfonate by conventional procedures, such as filtration, evaporation, solvent extraction, and crystallization.

The 1-β-D-arabinofuranosyluracil product (Formula IV) is then obtained by treating the 1-(2',3'-epoxy-β-D-lyxofuranosyl)uracil with dilute aqueous acid, for example, from 0.05 to 1 N sulfuric or phosphoric acid. The reaction can be carried out through a range of temperatures, preferably between about 25° and 100° C., conveniently at about 100° C., care being taken that the solution is not taken to dryness. The excess acid is removed and the 1-β-D-arabinofuranosyluracil product is purified by conventional procedures.

The following examples are illustrative of the process and products of the present invention, but are not to be construed as limiting.

EXAMPLE 1

*Preparation of 1-β-D-arabinofuranosyl-5-methyluracil*

PART A.—PREPARATION OF 1-(3',5'-O-ISOPROPYLIDENE-β-D-XYLOFURANOSYL)-5-METHYLURACIL

An acid catalyst solution was prepared by mixing 5.2 ml. of pure acetone, previously chilled in an acetone-solid carbon dioxide bath, with 0.5 ml. of concentrated sulfuric acid. This solution was maintained in the cold bath while being thoroughly mixed. The cold catalyst solution was added to a suspension of 516.0 mg. (2.0 millimoles) of 1-β-D-xylofuranosyl-5-methyluracil and 2.64 g. of anhydrous cupric sulfate in 32 ml. of acetone; the mixture was stirred vigorously, while protected from external moisture with a drying tube. The catalyst solution vessel was rinsed with approximately 0.5 ml. of acetone and the rinse was added to the reaction mixture. After stirring the latter for 8 hours, it was filtered, the residual cupric sulfate was washed with acetone, and the combined acetone washings and filtrate was poured into 50 ml. of ice-cold 5% aqueous sodium carbonate solution. The neutralized mixture was extracted with seventeen 7-ml. portions of chloroform, the pooled extracts were dried over anhydrous sodium sulfate, and the chloroform was removed under reduced pressure and a bath temperature of about 40° C. The resulting pale yellow solid (685 mg.) was suspended in 100 ml. of hot methylcyclohexane, enough chloroform was added to effect solution, and the still warm solution was stirred with activated charcoal (Darco G-60). The suspension was filtered, and the filtrate allowed to cool spontaneously, whereupon the 1-(3',5'-O-isopropylidene-β-D-xylofuranosyl)-5 - methyl - uracil crystallized in the form of white glistening plates. After refrigeration at 0° C., the product was collected on a filter, washed with cold hexane, and dried in air. Yield, 475 mg. (79.7%); M.P. 187° to 189° C. For analysis, a 100 mg. portion was recrystallized from methylcyclohexane:chloroform yielding 1-(3',5'-O-isopropylidene-β-D-xylofuranosyl)-5-methyluracil melting at 188° to 188.5° C.

Analysis:
Calculated for $C_{13}H_{18}N_2O_6$: C, 52.34; H, 6.08; N, 9.39.
Found: C, 53.04; H, 6.14; N, 9.39.
Optical rotation: $[\alpha]_D^{24}$ −56° (c. 0.6712 in chloroform).
Ultraviolet absorption:

$$\lambda_{max.}^{CHCl_3} \ 267–268 \ m\mu \ (A_M \ 8966)$$

Characteristic infrared absorption frequencies (cm.$^{-1}$):
OH—3370, 3210.
=CH—3060.
C=O—1703.
C—O—1107.
$R_f$—0.626 (water-saturated n-butanol, descending).

PART B.—PREPARATION OF 1-[3',5'-O-ISOPROPYLIDENE-2'-O-(METHYLSULFONYL)-β-D - XYLOFURANOSYL]-5-METHYLURACIL

To a solution of 298.3 mg. (1.0 millimole) of 1-(3',5'-O-isopropylidene-β - D - xylofuranosyl) - 5 - methyluracil (Part A, above) in 4.0 ml. of purified pyridine was added approximately 212 mg. (0.14 ml.; 1.85 millimoles) of freshly distilled methylsulfonyl chloride. The reaction flask was closed securely, the contents were thoroughly mixed, and it was allowed to stand at about 25° C. for 76 hours. The reaction mixture was then diluted with 20 ml. of water, and allowed to stand at about 25° C. with intermittent scratching of the walls of the flask. Crystallization began after two days, and after refrigerating the crystallizing mixture at 0° C. for several days longer, the nearly white 1-[3'-5'-O-isopropylidene-2'-O-(methylsulfonyl)-β-D-xylofuranosyl]-5-methyluracil was collected, washed with ice-water and oven-dried at 85° C. Yield, 255 mg. (67.8%); M.P. 167.5° to 168.5° C.

Analysis:
Calculated for $C_{14}H_{20}N_2O_8S$: C, 44.66; H, 5.36; S, 8.52.
Found: C, 44.44; H, 5.29; S, 8.53.
Optical rotation: $[\alpha]_D^{24}$ −27° (c. 0.9286 in chloroform).
Ultraviolet absorption:

$$\lambda_{max.}^{CHCl_3} \ 265 \ m\mu \ (A_M \ 9841)$$

Characteristic infrared absorption frequencies (cm.$^{-1}$):
OH—3150.
C=O—1709 sh., 1687 sh., 1660.
Covalent sulfonate—1370, 1125 sh., 1106.
C—O—1184.
$R_f$—0.75 (water-saturated n-butanol, descending).

PART C.—PREPARATION OF 1-(2'-O-METHYLSULFONYL-β-D-XYLOFURANOSYL)-5-METHLURACIL

A solution of 753 mg. (2.0 millimoles) of 1-[3'-5'-O-isopropylidene-2'-O-(methylsulfonyl) - β - D-xylofuranosyl]-5-methyluracil (prepared as in Part B) in 8 ml. of 70% (v./v.) aqueous acetic acid was heated in a bath at 52° to 55° C. for 7 hours. The reaction vessel was removed from the bath and allowed to stand at about 25° C. for 12 hours. After adding activated charcoal, the straw-colored reaction mixture was stirred for 45 minutes. The suspension was filtered through a bed of filter aid, the filter bed was washed with the 70% aqueous acetic acid, and the volatile components were evaporated from the combined filtrates at about 0.4 mm. of mercury pressure and a bath temperature of about 45° to 50° C. The foamy residue was swirled with dry toluene and the toluene was evaporated as above. The dry toluene wash and removal at reduced pressure was repeated. The non-crystalline residue was dissolved in absolute ethanol, and the ethanol removed at a pressure of about 0.4 mm. of mercury and a bath temperature of 40° C.; this procedure was carried out three times. The residual solid thus obtained was held at 0.2 to 0.3 mm. of mercury pressure for 1.5 hours. Yield, 710 mg.; M.P. 143° to 147° C.

The crude material thus obtained was triturated thoroughly with chloroform, collected, washed with chloroform and dried in air. The resulting crude product (610 mg.; M.P. 146° to 149° C.) was dissolved in 10 ml. of absolute ethanol. Decolorizing activated charcoal was added to the solution, and after stirring, the suspension was filtered. The filter bed was washed with absolute ethanol, and the filtrate and washings were combined and evaporated to a volume of approximately 7 ml. by mild heating. After seeding the concentrated solution, crystallization occurred rapidly, and was completed by refrigeration, first at 0° C., then at −20° C. The 1-(2'-O-methylsulfonyl-β-D-xylofuranosyl)-5-methyluracil was collected, washed with cold absolute ethanol, and dried in an oven at 85° C. Yield, 440 mg. (65.6%); M.P. 152° to 153.5° C.

Analysis:
Calculated for $C_{11}H_{16}N_2O_8S$: C, 39.28; H, 4.80; N, 8.33; S, 9.53.
Found: C, 39.57; H, 4.72; N, 8.63; S, 9.50.

Optical rotation: $[\alpha]_D^{25}$ 0° (c. 0.988 in methanol).

Ultraviolet absorption:

$\lambda_{min.}^{95\% \text{ EtOH}}$ 233–235 m$\mu$ (A$_M$ 2137)

$\lambda_{max.}^{95\% \text{ EtOH}}$ 264–265 m$\mu$ (A$_M$ 9512)

Characteristic infrared absorption frequencies (cm.$^{-1}$):
OH/NH—3460 sh., 3400 sh., 3340, 3180.
Non-conj. C=O—1722.
Conj. C=O—1687.
Conj. C=C—1650.
S—O—1367, 1177, 1170.
C—O—1070, 1042, 1005, 995, 987, 980, 972.

PART D.—PREPARATION OF 1-(2',3'-EPOXY-β-D-LYXOFURANOSYL)-5-METHYLURACIL

To a solution of 1.008 g. (3.0 millimoles) of 1-(2'-O-methylsulfonyl-β-D-xylofuranosyl)-5 - methyluracil (prepared as in Part C) in 45 ml. of absolute methanol was added 15.0 ml. of freshly prepared 0.2 M methanolic sodium methoxide solution [equivalent to 162.0 mg. (3.0 millimoles) of sodium methoxide]. This strongly alkaline solution, after heating under reflux for 1.5 hours, was neutral to phenophthalein. The methanol was removed under reduced pressure and bath temperature up to 70° C. The somewhat gummy residue was triturated thoroughly with boiling absolute ethanol, and the insoluble sodium methylsulfonate was separated by filtration and washed with additional hot absolute ethanol. After removing the ethanol from the combined filtrate and washings under reduced pressure and a bath temperature of about 60° C., there remained 690 mg. of non-crystalline solid. This crude material was swirled with a small volume of hot 95% ethanol, the mixture was filtered, and the filter cake was washed with hot 95% ethanol. The pale yellow filtrate was refrigerated at −20° C., and a small amount (about 35 mg.) of insoluble material that separated was collected on a filter and discarded. The filtrate was allowed to evaporate at about 25° C., and 348 mg. of crystalline solid melting at 141° to 143° C. was recovered. The crude product was dissolved in hot absolute ethanol, the solution was filtered, the filter was washed with warm absolute ethanol, and the combined filtrate and washings were concentrated to a volume of about 1.5 ml. After cooling, the solution was seeded, whereupon crystallization occurred rapidly. The crystallizing mixture was kept at about 25° C. for 1.5 hours, then refrigerated at 0° C. The crystalline 1-(2',3'-epoxy-β-D-lyxofuranosyl)-5-methyluracil was collected on a filter, washed with cold absolute ethanol, and oven-dried at 85° C. Yield, 275 mg. (38.2%); M.P. 143.5° to 144.5° C.

Analysis:
Calculated for $C_{10}H_{12}N_2O_5$: C, 50.00; H, 5.04; N, 11.66.
Found: C, 49.81; H, 5.29; N, 11.43.

Optical rotation: $[\alpha]_D^{23}$ +24° (c. 0.7476 in 95% ethanol).

Ultraviolet absorption:

$\lambda_{min.}^{95\% \text{ EtOH}}$ 233 m$\mu$ (A$_M$ 2251)

$\lambda_{max.}^{95\% \text{ EtOH}}$ 264–265 m$\mu$ (A$_M$ 9552)

Characteristic infrared absorption frequencies (cm.$^{-1}$):
OH—3520, 3140.
C=O—1705 sh., 1700 sh., 1685.
C=N/C=C—1660 sh., 1638.
C—O/C—N—1307, 1270, 1200, 1090, 1055, 1038 sh.

PART E.—PREPARATION OF 1-β-D-ARABINOFURANOSYL-5-METHYLURACIL

A solution of 710 mg. (2.95 millimoles) of 1-(2',3'-epoxy-β-D-lyxofuranosyl)-5-methyluracil in 18 ml. of 0.1 N sulfuric acid was heated on a steam bath for 20 hours under a water-cooled condenser. The colorless solution was allowed to cool to room temperature, a small amount of solid material separated by filtration and the filtrate concentrated in vacuo until crystallization started (volume 5–8 ml.). The crystallization was allowed to proceed at room temperature for 2 days and the crystals were collected without any previous refrigeration. Yield, 465 mg. (61%) of white crystals which by paper chromatography were shown to contain a small amount of starting material. Recrystallization from water (about 13 ml./g.) gave pure 1-β-D-arabinofuranosyl-5-methyluracil; M.P. 245° to 249.3° C.

Analysis:
Calculated for $C_{10}H_{14}N_2O_6$: C, 46.51; H, 5.46; N, 10.85.
Found: C, 46.11; H, 5.62; N, 10.99.

Optical rotation: $[\alpha]_D^{25}$ +94 (c. 0.8336 in water).

Ultraviolet absorption:

$\lambda_{min.}^{H_2O}$ 234–235 m$\mu$ (A$_M$ 2359)

$\lambda_{max.}^{H_2O}$ 266–267 m$\mu$ (A$_M$ 10350)

Characteristic infrared absorption frequencies (cm.$^{-1}$):
OH—3335, 3250 sh.
C=O—1713, 1698, 1675.
C=C/C=N—1660.
C—O—1052, 1038.
$R_f$—0.44 (n-butanol:piperidine:water (81:2:17); borate buffered paper).

EXAMPLE 2

Following the procedure of Example 1, Part C, but substituting

1-[3',5'-O-benzylidene-2'-O-(methylsulfonyl)-β-D-xylofuranosyl]-5-methyluracil,
1-[3',5'-O-ethylidene-2'-O-(methylsulfonyl)-β-D-xylofuranosyl]-5-methyluracil,
1-{3',5'-O-[(1-methylheptylidene)-2'-O-(methylsulfonyl)-β-D-xylofuranosyl]}-5-methyluracil, and
1-{3',5'-O-[(1-methylpropylidene)-2'-O-(methylsulfonyl)-β-D-xylofuranosyl]}-5-methyluracil for 1-[3′,5′-O-isopropylidene-2′-O-(methylsulfonyl)-β-D-xylofuranosyl]-5-methyluracil;

1-(2′-O-methylsulfonyl-β-D-xylofuranosyl)-5-methyluracil was prepared which was treated with methanolic sodium methoxide according to the procedure of Part D, to obtain 1-(2′,3′-epoxy-β-D-lyxofuranosyl)-5-methyluracil, which in turn was treated with dilute sulfuric acid according to the procedure of Part E to obtain 1-β-D-arabinofuranosyl-5-methyluracil.

EXAMPLE 3

Following the procedure of Example 1, Part D, but substituting 1-(2′-O-ethylsulfonyl-β-D-xylofuranosyl)-5-methyluracil, 1-(2′-O-phenylsulfonyl-β-D-xylofuranosyl)-5-methyluracil, 1-[2′-O-(p-methylphenylsulfonyl)-β-D-xylofuranosyl]-5-methyluracil, 1-[2′-O-(p-bromophenylsulfonyl)-β-D-xylofuranosyl]-5-methyluracil, 1-[2′-O-(p-nitrophenylsulfonyl)-β-D-xylofuranosyl]-5-methyluracil, and 1-(2′-O-phenethylsulfonyl-β-D-xylofuranosyl)-5-methyluracil for 1-(2′-O-methylsulfonyl-β-D-xylofuranosyl)-5-methyluracil;

1-(2′,3′-epoxy-β-D-lyxofuranosyl)-5-methyluracil was prepared which was treated with dilute sulfuric acid according to the procedure of Part E to obtain 1-β-D-arabinofuranosyl-5-methyluracil.

EXAMPLE 4

Following the procedure of Example 1, Parts A, B, C, D, and E, but substituting

1-β-D-xylofuranosyluracil,
1-β-D-xylofuranosyl-5-ethyluracil,
1-β-D-xylofuranosyl-5-isopropyluracil,
1-β-D-xylofuranosyl-5-hexyluracil,
1-β-D-xylofuranosyl-5-octyluracil,
1-β-D-xylofuranosyl-5-fluorouracil, and
1-β-D-xylofuranosyl-5-chlorouracil for 1-β-D-xylofuranosyl-5-methyluracil;
1-β-D-arabinofuranosyluracil,
1-β-D-arabinofuranosyl-5-ethyluracil,
1-β-D-arabinofuranosyl-5-isopropyluracil,
1-β-D-arabinofuranosyl-5-hexyluracil,
1-β-D-arabinofuranosyl-5-octyluracil,
1-β-D-arabinofuranosyl-5-fluorouracil, and
1-β-D-arabinofuranosyl-5-chlorouracil, respectively, were prepared.

I claim:

1. The process for preparing a 1-β-D-arabinofuranosyluracil represented by the following structural formula

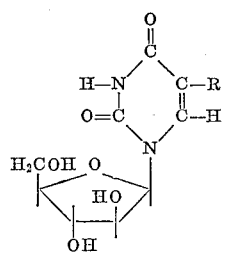

wherein R is selected from the group consisting of hydrogen, halogen, and lower-alkyl which comprises hydrolyzing with acid a xylofuranosyl nucleoside represented by the following structural formula

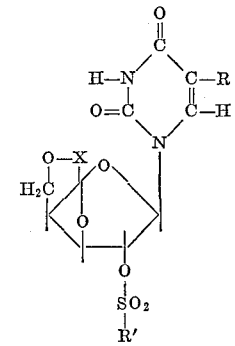

wherein R is as defined above; R′ is selected from the group consisting of lower-alkyl, phenyl, alkylphenyl, halophenyl, and phenylalkyl; and X is selected from the group consisting of alkylidene and aralkylidene to produce the corresponding 1-[2′-O-(R′-sulfonyl)-β-D-xylofuranosyl]uracil, subjecting the thus-produced 1-[2′-O-(R′-sulfonyl)-β-D-xylofuranosyl]uracil to alkaline hydrolysis to produce the corresponding 1-(2′,3′-epoxy-β-D-lyxofuranosyl)uracil, and hydrolyzing with dilute aqueous acid the thus-produced 1-(2′,3′-epoxy-β-D-lyxofuranosyl) uracil to obtain the corresponding 1-β-D-arabinofuranosyluracil.

2. The process for preparing 1-β-D-arabinofuranosyl-5-alkyluracils, which comprises hydrolyzing with acid a 1-[3′,5′-O-alkylidene-2′-O-(R′-sulfonyl)-β-D-xylofuranosyl]-5-alkyluracil to produce the corresponding 1-[2′-O-(R′-sulfonyl)-β-D-xylofuranosyl]-5-alkyluracil, hydrolyzing with alcoholic alkali metal alkoxide the thus-produced 1-[2′-O-(R′-sulfonyl)-β-D-xylofuranosyl]-5-alkyluracil to produce the corresponding 1-(2′,3′-epoxy-β-D-lyxofuranosyl)-5-alkyluracil and hydrolyzing with dilute aqueous acid the thus-produced 1-(2′,3′-epoxy-β-D-lyxofuranosyl)-5-alkyluracil to obtain the corresponding 1-β-D-arabinofuranosyl-5-alkyluracil.

3. The process for preparing 1-β-D-arabinofuranosyl-5-methyluracil, which comprises hydrolyzing with aqueous acetic acid 1-[3′,5′-O-isopropylidene-2′-O-(methylsulfonyl)-β-D-xylofuranosyl]-5-methyluracil to produce 1-(2′-O-methylsulfonyl-β-D-xylofuranosyl)-5-methyluracil, hydrolyzing with methanolic sodium methoxide the 1-(2′-O-methylsulfonyl-β-D-xylofuranosyl)-5-methyluracil to produce 1-(2′,3′-(epoxy-β-D-lyxofuranosyl)-5-methyluracil, and hydrolyzing with aqueous sulfuric acid the 1-(2′,3′-epoxy-β-D-lyxofuranosyl)-5-methyluracil to obtain 1-β-D-arabinofuranosyl-5-methyluracil.

4. The compound 1-[2′-O-(R′-sulfonyl)-β-D-xylofuranosyl]uracil represented by the formula

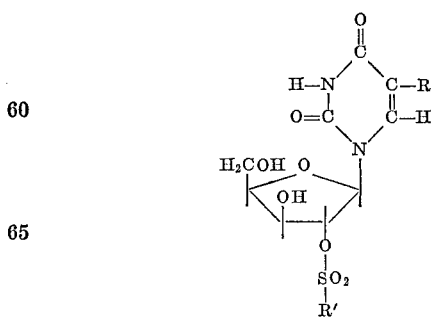

wherein R is selected from the group consisting of hydrogen, halogen, and lower-alkyl; and R′ is selected from the group consisting of lower-alkyl, phenyl, alkylphenyl, halophenyl, and phenylalkyl.

5. The compound 1-(2′-O-methylsulfonyl-β-D-xylofuranosyl)-5-methyluracil.

6. The compound 1-(2',3'-epoxy-β-D-lyxofuranosyl) uracil represented by the formula

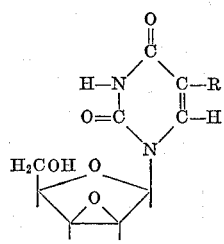

wherein R is selected from the group consisting of hydrogen, halogen, and lower-alkyl.

7. The compound 1-(2',3'-epoxy-β-D-lyxofuranosyl)-5-methyluracil.

8. The process which comprises hydrolyzing with acid a xylofuranosyl nucleoside represented by the following structural formula

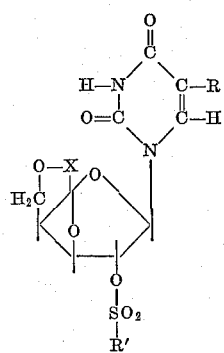

wherein R is selected from the group consisting of hydrogen, halogen, and lower-alkyl; R' is selected from the group consisting of lower-alkyl, phenyl, alkylphenyl, halophenyl, and phenylalkyl, and X is selected from the group consisting of alkylidene and aralkylidene to produce the corresponding 1-[2'-O-(R'-sulfonyl)-β-D-xylofuranosyl] uracil, and hydrolyzing with base the thus-produced 1-[2'-O-(R'-sulfonyl)-β-D-xylofuranosyl]uracil to produce the corresponding 1-(2'-3'-epoxy-β-D-lyxofuranosyl)uracil.

9. The process which comprises hydrolyzing with acid 1 - [3',5'-O-isopropylidene-2'-O-(R'-sulfonyl)-β-D-xylofuranosyl]-5-alkyluracil to produce 1-[2'-O-(R'-sulfonyl)-β-D-xylofuranosyl]-5-alkyluracil.

10. The process which comprises hydrolyzing with acid 1 - [3',5'-O-isopropylidene-2'-O-(R'-sulfonyl)-β-D-xylofuranosyl]-5-methyluracil to produce 1-[2'-O-(R'-sulfonyl)-β-D-xylofuranosyl]-5-methyluracil.

11. The process which comprises hydrolyzing with base a 1-[2'-O-(R'-sulfonyl)-β-D-xylofuranosyl]uracil represented by the following structural formula

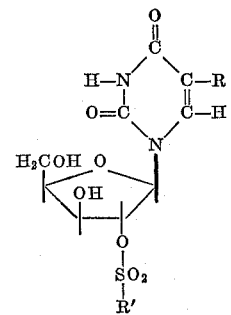

wherein R is selected from the group consisting of hydrogen, halogen, and lower-alkyl; and R' is selected from the group consisting of lower-alkyl, phenyl, alkylphenyl, halophenyl, and phenylalkyl to produce the corresponding 1-(2',3'-epoxy-β-D-lyxofuranosyl)uracil.

12. The process which comprises hydrolyzing with base a 1-[2'-O-(R'-sulfonyl)-β-D-xylofuranosyl]uracil represented by the following structural formula

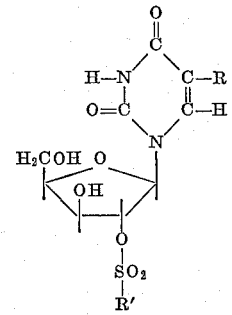

wherein R is selected from the group consisting of hydrogen, halogen, and lower-alkyl; R' is selected from the group consisting of lower-alkyl, phenyl, alkylphenyl, halophenyl, and phenylalkyl to produce the corresponding 1-(2',3'-epoxy-β-D-lyxofuranosyl)uracil and hydrolyzing the thus-produced 1-(2',3'-epoxy-β-D-lyxofuranosyl)uracil with dilute aqueous acid to produce the corresponding 1-β-D-arabinofuranosyluracil.

13. The process which comprises hydrolyzing a 1-(2',3'-epoxy-β-D-lyxofuranosyl)uracil of the formula

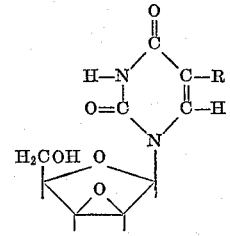

wherein R is selected from the group consisting of hydrogen, halogen, and lower-alkyl with dilute aqueous acid and recovering the corresponding 1-β-D-arabinofuranosyluracil.

14. The process of claim 13 wherein 1-(2',3'-epoxy-β-D-lyxofuranosyl)-5-methyluracil is hydrolyzed with dilute aqueous sulfuric acid at about 100° C. and 1-β-D-arabinofuranosyl-5-methyluracil is recovered.

15. The process of claim 13 wherein 1-(2',3'-epoxy-β-D-lyxofuranosyl)uracil is hydrolyzed with dilute aqueous sulfuric acid at about 100° C. and 1-β-D-arabinofuranosyluracil is recovered.

References Cited by the Examiner

Advances in Carbohydrate Chemistry 8, (1953), pages 123 and 171–175. Academic Press, N.Y.C.

Fox et al.: J.A.C.S. 79 (1957), pages 2775–2778.

Pigman: The Carbohydrates, 1957, pages 163–168, Academic Press Inc., New York, N.Y.

LEWIS GOTTS, *Primary Examiner.*

ABRAHAM H. WINKELSTEIN, *Examiner.*